Oct. 18, 1932.   J. A. SPENCER   1,883,252

THERMOSTAT

Filed Aug. 15, 1931

John A. Spencer,
Inventor.

Patented Oct. 18, 1932

1,883,252

UNITED STATES PATENT OFFICE

JOHN A. SPENCER, OF NEWTONVILLE, MASSACHUSETTS, ASSIGNOR TO GENERAL PLATE COMPANY, OF ATTLEBORO, MASSACHUSETTS, A CORPORATION OF MASSACHUSETTS

THERMOSTAT

Application filed August 15, 1931. Serial No. 557,233.

This invention relates to thermostats, and with regard to certain more specific features to a snap-acting thermostat which upon operation produces a large amount of force with a relatively large throw.

This invention is a continuation in part of my United States patent application, filed June 26, 1930, Serial No. 463,960.

Among the several objects of the invention may be noted the provision of a thermostatic unit comprising at least one flexible sheet, adapted to be flexed to its alternative position by the stresses produced by a plurality of thermostatic strips; the provision of a thermostatic unit of the class described which operates with a snap action; the provision of a thermostatic unit of the class described which produces said snap action without the thermostatic elements themselves comprising snap-acting elements; and the provision of a device of the class described which effects a relatively large force and/or a relatively large motion in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated several of various possible embodiments of the invention, Fig. 1 is a top plan view of one form of a thermostatic unit constructed in accordance with the invention;

Similar reference characters indicate corresponding parts throughout the several views of the drawing.

Figure 1:
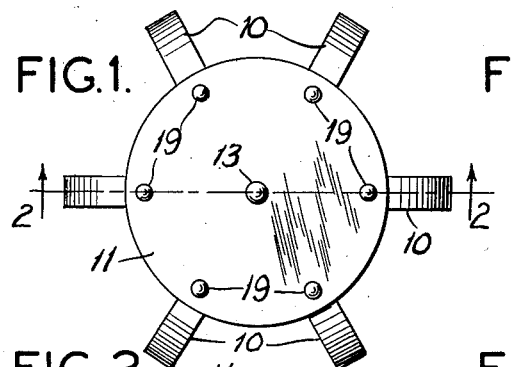
Figure 2:
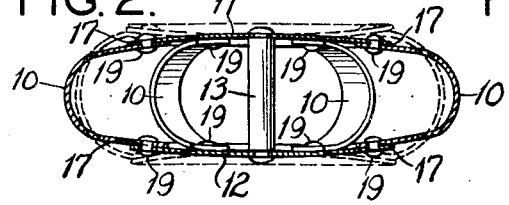
Fig. 2 is a vertical section taken on line 2—2 of Fig. 1.

Referring now more particularly to Figs. 1 and 2 of the drawing, there is shown a thermostatic unit comprising two discs 11 and 12 formed from flexible non-thermostatic material. The discs or sheets are separated at their center portions by a pin 13.

The sheets 11 and 12 are permanently "dished" and arranged to normally assure a position as shown in solid lines in Figs. 1 and 2, in which the concave surfaces face each other. If the discs are stressed properly they will snap to their alternative positions (convex surfaces facing each other) the discs going through a state of unbalance in changing from one position to the other.

It is to be understood that the discs 11 and 12 may be "dished" and non-developable, or developable (for instance, conic) and/or corrugated as described in my copending United States patent application filed June 26, 1930, Serial No. 463,961. All of these shapes provide the desired unstable state when the discs are flexed from one position to another and consequently effects the change with a snap action.

Figure 9:
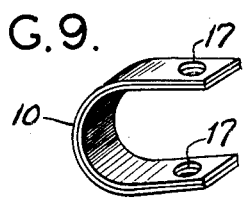
Fig. 9 is an enlarged detail view of a composite thermostatic strip.

To provide the stress to flex the sheets 11 and 12 to their alternative positions bent thermostatic strips 10 are fastened to the edges of the sheets by rivets or the like 19 through holes 17 (Fig. 9).

The thermostatic elements 10 are formed from materials with layers having different coefficients of expansion. The elements become deformed as the temperature changes, due to the difference in expansion of the components or layers making up the composite sheets or strips. Thus if strips such as 10, are curved or bent, heating or cooling the strips will cause them to straighten or to bend, depending upon the positioning of the more expansible component thereof relative to the inside or the outside of the curve. As shown in Figs. 1 and 2, the more expansible component of the strip 10 is placed on the inside of the bent strips and as the temperature is raised, the strips 10 tend to straighten out. As the strips 10 thus straighten, they flex the edges of the plates 11 and 12, from their natural position, shown by the solid lines in Fig. 2, to their alternative position, and the plates 11 and 12 thus at a critical temperature, snap through an unbalanced state, and assume the dotted line position of Fig. 2 with a snap action.

After the thermostatic strips 10 have cooled down to a point where the strain which was placed on the edges of the dished sheets 11 and 12 is not sufficient to hold the sheets 11 and 12 in their flexed position the sheets 11 and 12 snap back to their normal positions as shown by the solid lines. This flexing of the sheets 11 and 12 may be carried out an indefinite number of times. If desired the unit can be made to operate in steps by providing the discs 11 and 12 with different force characteristics whereby they will flex under different conditions of stresses.

Figure 3:
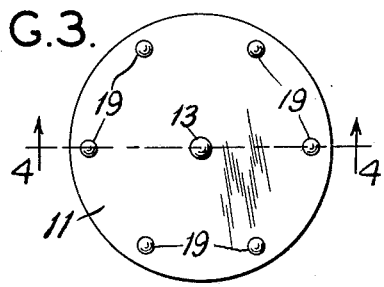
Fig. 3 is a top plan view of a modified form of the thermostatic unit.
Figure 4:
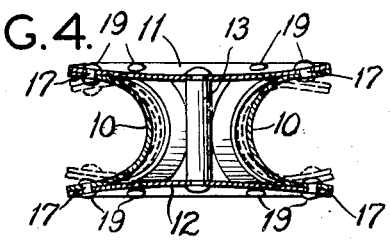
Fig. 4 is a vertical section taken on line 4—4 of Fig. 3.

Referring to the modification shown in Figs. 3 and 4, the sheets 11 and 12 are identical with sheets 11 and 12 of Figs. 1 and 2 except for the fact that they are "dished" in the opposite direction. Thus they present normally juxtaposed convex rather than concave surfaces (Fig. 4). Also in the modification of Figs. 3 and 4, the strips 10 are formed with the component having the greater coefficient of expansion placed on the outside of the curve of the bend. As the temperature of the strips 10 is raised, the strips 10 curl or bend rather than straighten and so tend to pull the edges of the sheets 11 and 12 together, and when the pull exerted by the strips 10 slightly exceeds that strain which is necessary to flex the sheets 11 and 12 to their alternative position, the sheets 11 and 12 go to the latter position with a snap action (dotted line position Fig. 4).

In this modification the thermostatic strips 10 are placed so that the convex surfaces of the strips are adjacent the pin 13. This provides a more compact unit than that shown in Fig. 1.

An advantage of the modifications of the thermostatic units as disclosed in Figs. 1 through 4 is that, inasmuch as both of the sheets 11 and 12 may be flexed, a larger or stepped throw may be obtained without any reduction in the strength of the unit.

Figure 5:
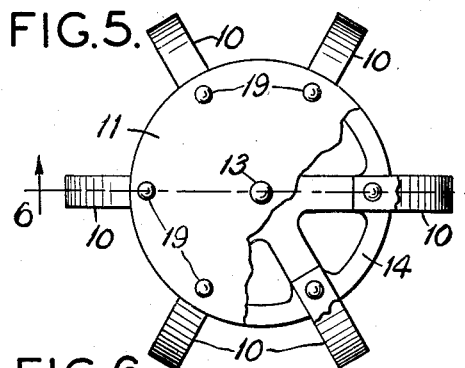
Fig. 5 is a broken away plan view of another modification of a thermostatic unit.
Figure 6:
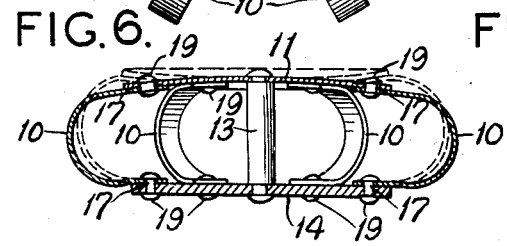
Fig. 6 is a vertical section taken on line 6—6 of Fig. 5.

In the modification of Figs. 5 and 6, the sheet 12 has been substituted by a rigid cut out base 14 which is not flexible. However, the sheet 11 and strips 10 have been retained, as shown in Figs. 1 and 2. By substituting the non-flexible sheet 14 for the sheet 12 a shorter throw is effected.

Figure 7:
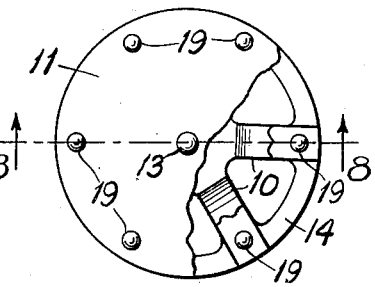
Fig. 7 is a top plan view of another modification.
Figure 8:
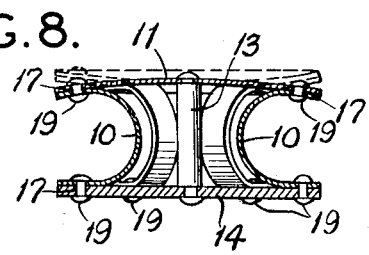
Fig. 8 is a vertical section taken on line 8—8 of Fig. 7.

In Figs. 7 and 8, the thermostatic strips 10 are shown bent in the opposite direction from the bending of those of Figs. 5 and 6, but the material having the greater coefficient of expansion is retained on the inside of the bend thus causing the strips to tend to straighten as they are heated.

It will be noted that the several embodiments of the invention all provide a snap-acting thermostat which permits of varying the number of strips without disturbing the temperatures at which the device operates. The magnitude of the throw may be altered by suitable design and the strength of the device may be varied by changing the number of thermostatic strips used.

The invention also provides a thermostat which is inherently snap-acting without the use of a snap-acting thermostatic sheet. It is to be understood, however, that non-developable thermostatic strips may be used and that the device will still permit of the same changes without a change in the thermostatic members themselves.

Although the thermostatic members are shown as bimetallic, it is to be understood that the invention is not limited thereby. Any composite sheet may be used including that which comprises two or more layers of metal of different coefficients of expansion joined together so as to effect a change of shape with a change in temperature.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A thermostat comprising a snap acting flexible sheet, a second sheet, said first sheet being rigidly separated at a portion thereof from said second sheet, and thermostatic strips joining said sheets at non-rigidly separated portions.

2. A thermostat comprising a snap acting flexible sheet, a second sheet, said first sheet being separated from said second sheet, and a plurality of bent thermostatic strips joining said sheets at the edges thereof, said strips being adapted to flex said flexible sheet to assume alternative shapes upon changes of temperature.

3. A thermostat comprising at least two "dished" flexible sheets, means between said sheets adapted to rigidly separate a portion of said sheets, a plurality of thermostatic strips joining non-rigidly separated parts of said sheets, said strips being adapted to flex said sheets to assume alternative shapes with changes in temperature.

4. A thermostat comprising at least two "dished" flexible sheets, means between said sheets adapted to rigidly separate a portion of said sheets, a plurality of bent thermostatic strips joining non-rigidly separated parts of said sheets, said strips being adapted to tend to straighten upon increased temperatures and to tend to bend upon decreased temperatures, and to flex said sheets to assume alternative shapes at critical temperatures.

5. A thermostat comprising at least two "dished" flexible sheets, means between said sheets adapted to rigidly separate a portion of said sheets, a plurality of bent thermostatic strips joining non-rigidly separated parts of said sheets, said strips being adapted to tend to bend more upon increased temperatures, and to flex said sheets to assume alternative shapes at critical temperatures.

6. A snap-acting thermostatic unit comprising cup shaped discs adapted to assume alternative positions under certain stresses and strains with a snap action, means joining the centers of said discs and rigidly separating them, and a plurality of thermostatic strips joining the edges of said discs and adapted at critical temperatures to effect said stresses and strains, whereby said discs snap to alternative positions.

7. A thermostatic unit comprising a plurality of sheets, at least one of which is flexible, means rigidly spacing the sheets apart at their middle portions, and a deformable thermostatic means secured to the said sheets to deform the flexible sheet upon temperature changes.

8. A thermostatic unit comprising a plurality of curved self-actuating thermostatic strips secured to a plurality of members, at least one of which is flexible, the curvature of the strips in the assembled unit being in the same direction, and means for rigidly spacing apart the said members at substantially the middle portions thereof, the said strips actuating the flexible members upon deformation of the strips due to stresses incurred therein by temperature changes.

In testimony whereof, I have signed my name to this specification this tenth day of August, 1931.

JOHN A. SPENCER.